United States Patent
Pryor et al.

(10) Patent No.: US 12,129,846 B2
(45) Date of Patent: Oct. 29, 2024

(54) METHOD AND SYSTEM FOR OPERATING A PUMP

(71) Applicant: Pulsafeeder, Inc., Punta Gorda, FL (US)

(72) Inventors: Fabrice Pryor, St. Petersburg, FL (US); James A. Nalasco, Nakomis, FL (US); Nicholas J. Yunker, Fort Meyers, FL (US); William P. McDougall, Venice, FL (US)

(73) Assignee: Pulsafeeder, Inc., Punta Gorda, FL (US)

( * ) Notice: Subject to any disclaimer, the term of this patent is extended or adjusted under 35 U.S.C. 154(b) by 148 days.

(21) Appl. No.: 17/385,427

(22) Filed: Jul. 26, 2021

(65) Prior Publication Data
US 2022/0025880 A1    Jan. 27, 2022

Related U.S. Application Data

(60) Provisional application No. 63/055,939, filed on Jul. 24, 2020.

(51) Int. Cl.

| | |
|---|---|
| *F04B 49/24* | (2006.01) |
| *C02F 1/00* | (2023.01) |
| *F04B 15/02* | (2006.01) |
| *F04B 23/02* | (2006.01) |
| *F04B 49/02* | (2006.01) |
| *F04B 49/06* | (2006.01) |

(Continued)

(52) U.S. Cl.
CPC ............. *F04B 49/24* (2013.01); *C02F 1/008* (2013.01); *F04B 15/02* (2013.01); *F04B 23/02* (2013.01); *F04B 49/02* (2013.01); *F04B 49/065* (2013.01); *F04B 49/10* (2013.01); *F04B 49/106* (2013.01); *F04B 51/00* (2013.01); *F04B 53/06* (2013.01); *F04B 2201/00* (2013.01); *F04B 2205/06* (2013.01); *F04B 2205/09* (2013.01)

(58) Field of Classification Search
CPC ........ F04B 49/02; F04B 49/065; F04B 49/10; F04B 49/106; F04B 49/24; F04B 15/02; F04B 23/02; F04B 51/00; F04B 53/06; F04B 2201/00; F04B 2205/06; F04B 2205/09; C02F 1/008
See application file for complete search history.

(56) References Cited

U.S. PATENT DOCUMENTS

| | | | | |
|---|---|---|---|---|
| 11,402,363 B2 * | 8/2022 | Jenkins | ................. | B01D 17/12 |
| 2001/0051371 A1 * | 12/2001 | Kiplinger | ............... | C12M 29/14 |
| | | | | 435/262 |

(Continued)

*Primary Examiner* — Charles G Freay
(74) *Attorney, Agent, or Firm* — Tucker Ellis LLP; Patrick F. Clunk (57) ABSTRACT

One or more techniques and/or systems are disclosed for a pumping system that includes a self-priming pump, a remotely coupled controller configured to operate the self-priming pump and other portions of the system, a discharge flow meter, and a bleed valve coupled to the self-priming pump. The system can be remotely accessed, programmed, and transmit data to a remote device. The bleed valve can comprise a loss of prime sensor in the body, and when the loss of prime is detected in the pump and/or the discharge flow meter detects a loss of flow, the pump and/or controller may be used to help re-establish prime in the pump by opening the relief outlet and operating the pump at an increased rate.

15 Claims, 8 Drawing Sheets

(51) Int. Cl.
*F04B 49/10* (2006.01)
*F04B 51/00* (2006.01)
*F04B 53/06* (2006.01)

(56) References Cited

U.S. PATENT DOCUMENTS

| | | | | |
|---|---|---|---|---|
| 2002/0117430 A1* | 8/2002 | Navarro | ............... | C02F 1/008 210/85 |
| 2009/0016901 A1* | 1/2009 | Morris, III | ............ | F04B 49/106 417/63 |
| 2019/0350404 A1* | 11/2019 | Pugliese | ............... | A47J 31/468 |
| 2021/0222689 A1* | 7/2021 | Kirch | ..................... | F04B 17/03 |

* cited by examiner

METHOD AND SYSTEM FOR OPERATING A PUMP

CROSS-REFERENCE TO RELATED APPLICATIONS

This application claims priority to U.S. Provisional Patent Application Ser. No. 63/055,939, entitled METHOD AND SYSTEM FOR OPERATING A PUMP, filed Jul. 24, 2020, which is incorporated herein by reference.

BACKGROUND

Self-priming pumps are used in a variety of applications to provide a target product to a system. One example is in the field of water treatment where certain chemicals are periodically added to the water for treatment. A self-priming pump may occasionally encounter various issues that may need corrective action in order to have a system function in a desired manner. As an example, a loss of prime, or another problem in the discharge line of the pump may impact proper performance. When these types of issues occur with a self-priming pump the supervisor or maintenance personnel may not be aware, which can lead to increased concern for the performance of a system utilizing the pump.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more techniques and systems are described herein for a pump system that can be used to automatically provide a treatment fluid to a target fluid, based on conditions of the target fluid. For example, a cooling system for a building may use water of some type of fluid coolant, which needs to be maintained in a desired condition so as to mitigate damage and/or maintenance issues to the cooling system. As described herein, a pump system can automatically detect the condition of the cooling fluid and provide treatment fluid to bring the cooling fluid to within a desired range from that condition. Further, a user may be able to remotely communicate with the pump system to see the status, and/or provide updates to the target ranges for various conditions, adjust system parameters.

In one implementation of a pump system, a self-priming pump that pumps a treatment fluid to a feed location of a target fluid can be operably coupled with a local communication network. Further, a controller can be operably connected to the local communication network, and can also be operably coupled with a remote communication network. A sensor array can comprise one or more sensors. The sensor array can be used to detect one or more conditions related to a condition of the target fluid, a condition of the treatment fluid, and/or a condition of the pump. In this implementation, the controller can control operation of the pump using the local communications network based at least on the one or more detected conditions. Additionally, data related to the one or more conditions, operation of the pump, and/or operation of the controller can be transmitted using the remote communication network.

In accordance with an embodiment of the subject innovation, a pumping system is provided that includes a self-priming pump, a bleed valve coupled to the self-priming pump, a controller configured to operate the self-priming pump and/or the bleed valve, and a discharge flow meter. The bleed valve includes a body, an inlet, a discharge outlet, and a relief outlet. The bleed valve further includes a loss of prime sensor in the body. When the loss of prime sensor detects a loss of prime in the pump and the discharge flow meter detects a loss of flow, the system is configured to re-establish prime in the pump by opening the relief outlet and operating the pump at an increased rate.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

The innovation may take physical form in certain parts and arrangements of parts, a preferred embodiment of which will be described in detail in the specification and illustrated in the accompanying drawings which form a part hereof, and wherein.

DETAILED DESCRIPTION

Embodiments of the innovation relate to methods and systems that relate to the operation of a pump system. A self-priming pump can be used to provide a treatment fluid to a target fluid, such as providing a treatment chemical to a water source, such a potable water, cooling tower water, water used in manufacture, etc. The treatment chemical can be used to bring the condition of the fluid (water) into conformance with a conditional parameter range that is desired for the target use of the fluid. As an example, the pH of the target fluid may be desired to be within a certain range for the target use, and/or to maintain condition of the conduit used to transport the fluid. In this example, a treatment chemical can be added to bring the fluid to within the target range.

The self-priming pump can be coupled to a bleed valve, and the bleed valve includes a body having a loss of prime sensor therein, an inlet, a discharge outlet, and a relief outlet. When the loss of prime sensor detects a loss of prime in the pump and the discharge flow meter detects a loss of flow, the system is configured to automatically re-establish prime in the pump by opening the relief outlet and operating the pump at an increased rate. The system can also include a controller configured to operate the self-priming pump and/or the bleed valve, and a discharge flow meter, and to remotely communicate with a remote device.

In certain embodiments, the pump system can be used to monitor and treat a process fluid (e.g., cooling tower water, or other types of fluids and water used in a facility) that is targeted to be within a desired range of characteristics, such a pH, corrosivity, conductivity, oxidation reduction potential (ORP), fluorescent tracers levels (pyrenetetrasulfonic acid (PTSA) level), and other characteristics or conditions of the target process fluid. The system can include a microprocessor based water treatment controller, a "smart" chemical metering pump, and a cloud based software solution that allows a user to remotely monitor and adjust control parameters via a mobile app, computer, or the like. The system provides benefits including allowing the system to be remotely controlled, and to provide remote status updates of the system. Further, the pump system can detect a loss of prime in the treatment (e.g., chemical) metering pump, it may recover from the loss of prime without user intervention, can measure the volumetric output of the chemical metering pump, and can detect a discharge line fault such as a discharge tube burst or leak.

With reference to the drawings, like reference numerals designate identical or corresponding parts throughout the several views. However, the inclusion of like elements in different views does not mean a given embodiment necessarily includes such elements or that all embodiments of the innovation include such elements. The examples and figures are illustrative only and not meant to limit the innovation, which is measured by the scope and spirit of the claims.

Figure 1A:
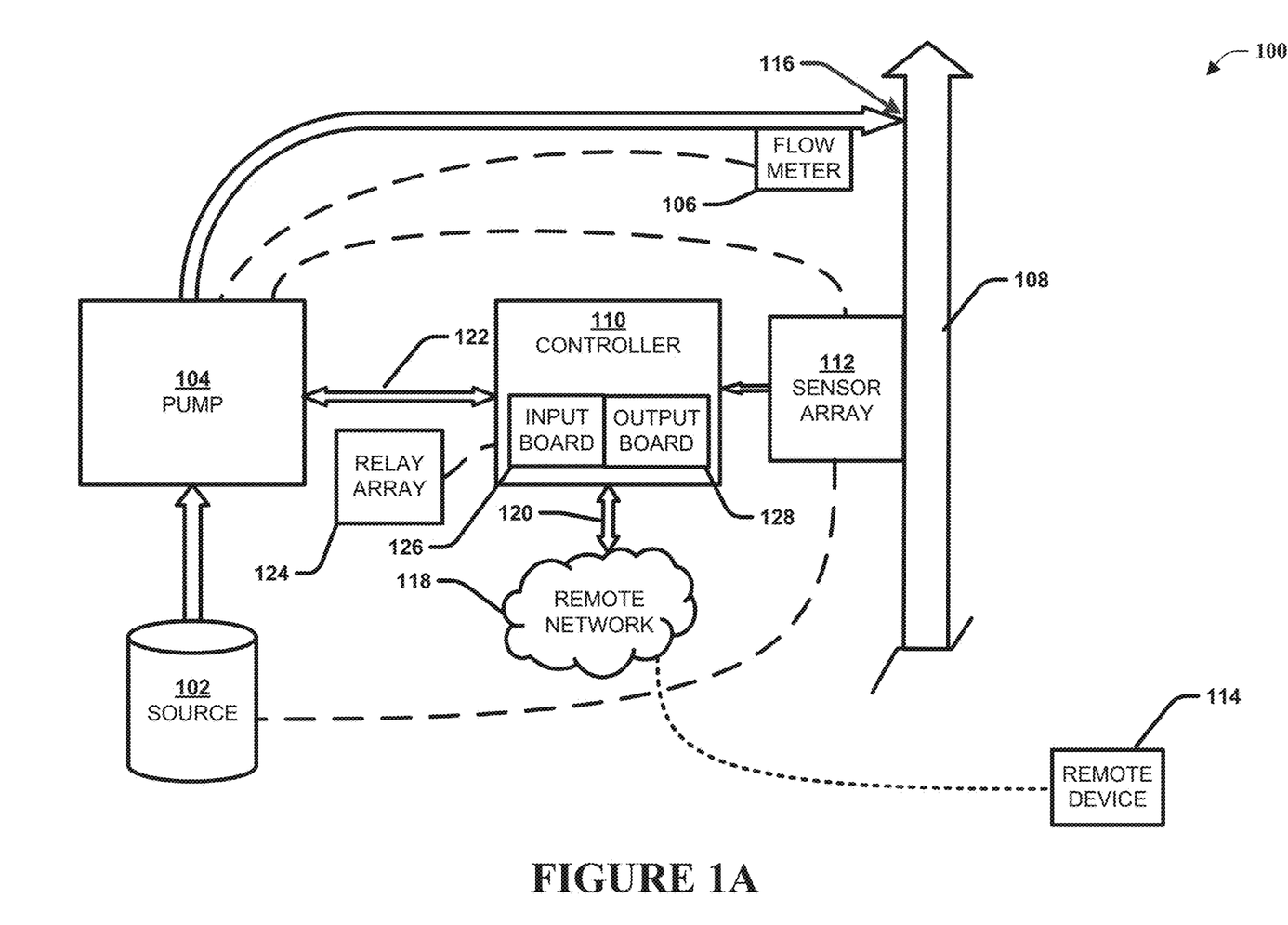
FIGS. 1A and 1B are schematic representations of an exemplary pump system.
Figure 1B:
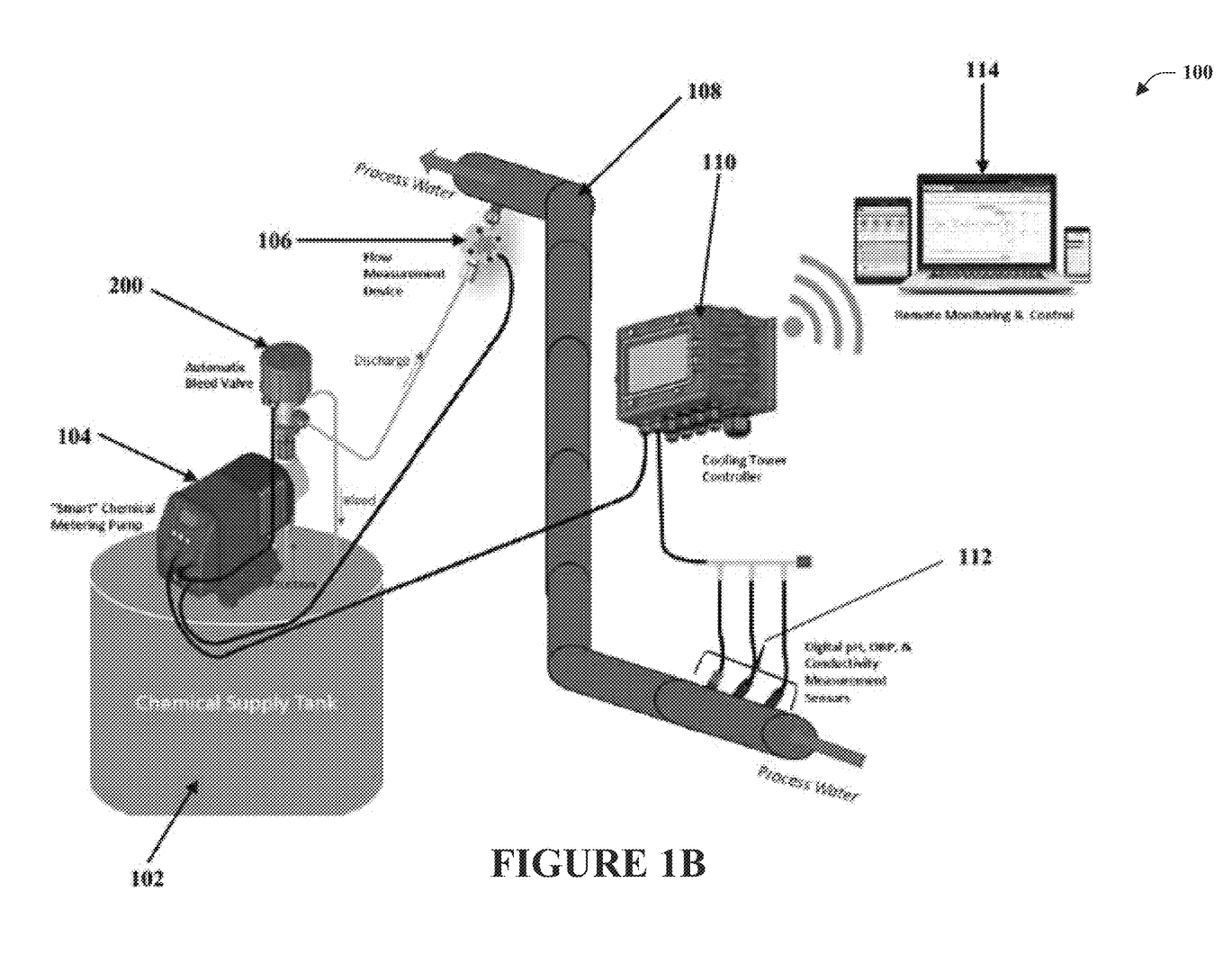

FIGS. 1A and 1B are schematic diagrams illustrating different example implementations of a pump system 100 that can be used to automatically (e.g., programmatically) treat a target fluid with a treatment fluid, and provide remote status data to a user, and be remotely updated by the user. As illustrated in FIG. 1A, a self-priming pump 104 that pumps a treatment fluid 102 to a feed location 116 of a target fluid 108. Further, the pump 104 is operably coupled with a local communication network 122, such as a CAN Bus network. A controller 110 is operably connected to the local communication network 122, and the controller 110 is further operably coupled with a remote communication network 118, such as over a wireless or wired communication system 120, so as to remotely communicate with a remote device 114, accessible by a user. The user may receive updates and status of the system 100, such as flow rates, amount of treatment fluid 102 remaining, time in use, volume provided as measured by a flow meter 106, condition of the target fluid 108, condition or status of the pump 104, and more.

A sensor array 112 can comprise one or more sensors, such as engaged with the target fluid 108, the pump 104, a treatment fluid source 102, and other portions of the system 100. The sensor array can use sensors to detect one or more conditions of the system 100, such as a condition of the target fluid 108 (e.g., pH, corrosivity, conductivity, ORP, PTSA level), a condition of the treatment fluid (e.g., flow rate, volume pumped, amount remaining), and/or a condition of the pump (e.g., active, inactive, loss of prime, rotation rate). In this implementation, the controller 110 can control operation of the pump 104 using the local communications network 122, and the controlling can be based at least on the one or more detected conditions by the sensor array 112. Further, data related to the one or more conditions detected by the sensor array 112, the operation of the pump 104, and/or the operation of the controller 110 can be transmitted to the remote device 114 using the remote communication network 118.

In FIG. 1B the pump system 100 includes a supply tank with the treatment fluid 102 and a pump 104 coupled to the fluid 102 supply tank. The target fluid in supply tank 102 can comprise any type of fluid that is used to treat the target fluid 108. In certain embodiments, the supply tank 102 contains a chemical used for the treatment of water, such as Sodium Hypochlorite. The pump 104 can be a self-priming pump such as a reciprocating diaphragm pump, and can be configured to pump fluid 102 out of the supply tank. In an embodiment, the pump 104 includes an inlet check valve and a discharge check valve along a flow path vertically from bottom to top. These valves mitigate flow of the treatment fluid 102 in an undesired direction (e.g., backward).

With reference to FIGS. 2-8, in this implementation, coupled to the pump 104 is a bleed valve 200. The bleed valve 200 can be positioned on top of the pump 104, and receive fluid flow from the pump 104 during the pump's 104 operation. The bleed valve 200 can comprise an embedded piezoelectric sensor 238 (shown in FIG. 7) that detects loss of prime, and an electronically actuated relief outlet valve. The prime status indication can be relayed to the pump 104, which relays the indication to a controller 110, which can then relay the indication to a remote device. These features of the bleed valve 200 allow the pump system 100 to communicate loss of prime to a user remotely, for example. Further, the bleed valve 200 can enable the pump system 100 to recover from loss of prime automatically, for example, without user intervention. This loss of prime recovery can be achieved by commanding a relief outlet of the bleed valve to open while the pump 104 runs at a target (e.g., an increased) stroke rate to induce recovery of loss of prime. This process is described in greater detail below with reference to FIG. 9. The pump 104 and the bleed valve 200 may also periodically run a flush cycle, for example, which allows the pump to remain primed during extended periods of non-use. For example, during this flush cycle process, the pump 104 can open the relief outlet of the bleed valve 200 and run to cycle fluid 102 through the lines and recirculate the fluid 102 back through the supply tank in order to reduce maintenance issues, such as calcification of fluid that has settled within the pump 104 head and valves.

Figure 2:
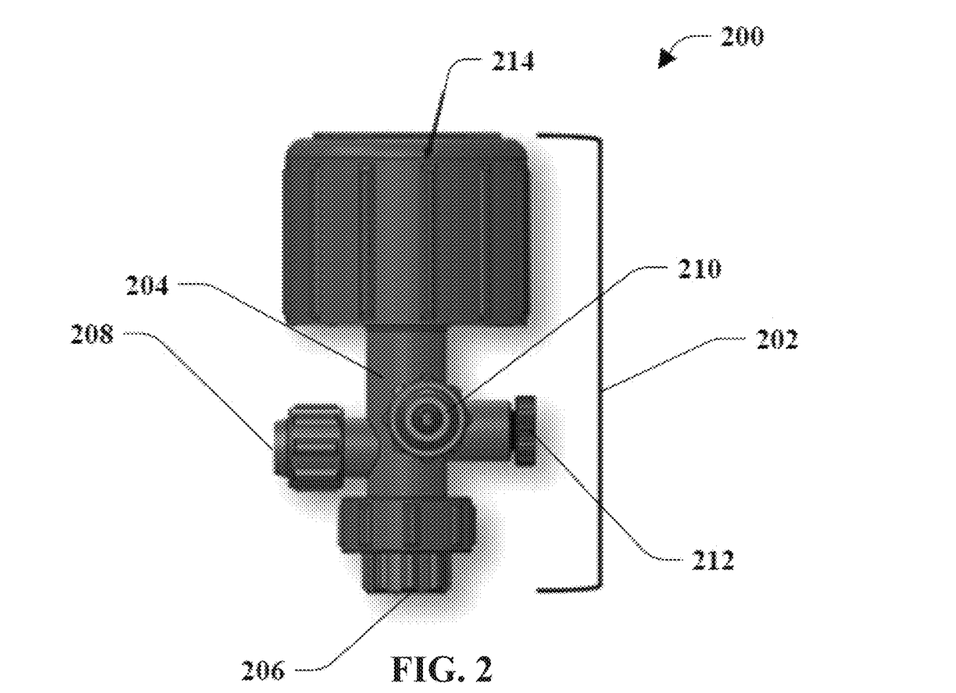
FIG. 2 is a side view of a bleed valve.

As illustrated in FIG. 2, the pump system 100 can also include a flow meter 106 located downstream from the pump 104 and bleed valve 200, and upstream from the feed location 116. As one example, the flow meter 106 can be located at an injection valve, at the feed location 116 of the target fluid 108, for example, located in a pipe such as a cooling tower recirculating water line. The flow meter 106 can detect a flow of fluid 102 through a discharge line from the bleed valve 200 and measure fluid output of the pump 104. The flow meter 106 can communicate flow status and/or fluid output measurements to the bleed valve 200, the pump 104, and/or the controller 110. The flow status may be an indication of no flow, low flow, or adequate flow, for example, or the flow status may be a digital or analog signal (e.g. communication via an internet protocol, a 4-20 mA signal, etc.) indicating the measured flow rate. In some implementations, using the flow status information from the flow meter 106, the pump 104 and/or bleed valve 200 may infer a discharge line fault and go into a user specified fault mode. For example, if the pump 104 detects that prime is sufficient using the bleed valve 200, yet the flow meter 106 is not indicating any flow, the system can infer that there is an issue between the bleed valve 200 and the flow meter 106, such as blockage or damage to the discharge tubing from the bleed valve 200. If the pump 104 detects this fault, the pump 104 can shut down if the user has the pump 104 configured to do so. Further, the flow meter 106 can also mitigate backflow through the discharge tubing.

The pump system 100 can also include the controller 110. The controller 110 can communicate with any of the pump 104, the bleed valve 200, the flow meter 106, and/or various probes or sensors 112 located at the target fluid 108. The controller 110 may communicate with any other component by way of the local communication network 122, a wired connection (e.g., Modbus, BACnet, etc.), a wireless connection, a remote connection 120, (e.g., an Ethernet protocol, or any other internet communication protocol, wired or wireless), and/or 120 or 240 VAC relay connections. The controller 110 can receive data from coupled devices and/or sensors 112 related to a condition of the target fluid 108. As an example, condition can include conductivity, pH, oxidation-reduction potential (ORP), corrosion, PTSA (fluorescent dye) tracing, temperature, flow rate, pressure, among others. The controller 110 can also provide commands to operate the pump 104. For example, the controller 110 can command the pump to start or stop, and can transmit pump speed control to the pump 104, therefore controlling the pump's 104 operation in displacing fluids from the supply tank 102. The controller 110 can also receive pump status information from the pump 102, including operation status (e.g. running, stopped, faulted), current operation settings, and any data from the bleed valve 200 or flow meter 106. The controller 110 can also command the pump 104 to run a prime verification sequence to ensure the pump 104 is ready and operational to prevent complications or missed dosing times.

The pump system 100 can also include a remote device 114 coupled to the pump system 100 using a remote communications network 118. The remote device 114 can be server based and/or cloud based, and is in communication with controller 110. The remote device 114 may communicate with the controller 110 via any type of internet communication protocol, wired or wireless, including but not limited to Ethernet or communication over a wireless communication or cellular network. The remote device 114 can receive probe, sensor, and/or pump data from the controller 110. Using this data, for example, the remote device 114 can plot charts and otherwise present the data to a user. Further, the remote device 114 can transmit configuration settings and tasks to the controller 110. The remote device 114 can also report warnings to a user regarding the pump 102 and controller 110 operation status and maintenance notifications.

In some implementations, the controller 110 activates operation of the pump 104 upon receiving an indication that a condition of the target fluid 108 is outside of a predetermined parameter. For example, the controller 110 can be programmed (e.g., remotely by the user of the remote device 114) to active a chemical pump 104 to pump a treatment fluid 102 to the target fluid when one of the conditions of the target fluid falls outside of a predetermined parameter range. For example, if the pH level of a cooling water drops below 5.5, as detected by one of the sensors 112, the controller can active a relay that operates a pump that pumps sodium hypochlorite into the target fluid. Thus, the pH may be increased to within a desired range.

In some implementations, the system 100 can comprise a relay array 124, comprising one or more relays that respectively operate (e.g., to turn on and off) a chemical dosing pump, or actuate motorized valves to control the process flow of chemicals from the pumps to the target feed location. As an example, the controller 110 can send 120 or 240 VAC to any of the relays in the array 124, as programmed based on desired parameter ranges for respective treatment fluids. Further, as an example, the desired parameter ranges can be used to maintain user defined setpoints for the target fluid 108. For example, the controller could receive data from a pH probe, notice that pH is low, and then activate a pH control relay which is connected to a dosing pump to dose a chemical that raises pH back to acceptable levels.

As an example, up to eight power relays 124 can be provided for the purpose of powering external devices. Each relay can have an upper output capability suitable for the operation of the devices typically used in the target fluid operation. Devices can include, but are not limited to: PULSAtron metering pumps; solenoid valves; and motorized ball valves. In this example, relays one through three can be SPDT type relays to support the operation for bidirectional devices such as motorized ball valves. Internal relay connectors can be provided that permit easy access by customers or electricians for connections of devices in the field.

Further, in some implementations, the controller 110 can comprise one or more programmable input circuit boards 126 or cards that operably receives sensor data from a first coupled device. For example, an input card 126 can set the controller up to take input from devices that operate off of a 4-20 mA signal (e.g., pressure sensor sending pressure data to controller). Additionally, the controller 110 can comprise one or more programmable output circuit boards 128 that operably transmits data to a second coupled device. For example, an output card 128 may enable the controller 110 to send data on selected parameter via 4-20 mA signal.

In some implementations, the controller 110 can comprise digital Inputs. For example, ten digital inputs can be provided to support dry contact and Hall Effect input devices. For example, a source level detector, water meters, etc. In these implementations, the controller 110 can support 6 water meter inputs capable of both Hall Effect or dry contact input. Further, analog 4-20 mA inputs and Outputs can be provided. For example, the controller can support a four analog signal slots. The analog signal slots can have a user defined input or output function based on the type of module installed by the end user. Further, two of the 4-20 mA inputs can be able to be powered by the controller 110. The 4-20 mA input circuit can have support that includes but is not limited to the following types of 4-20 mA devices:

free chlorine sensor
free chlorine dioxide sensor
PTSA and Corrosion sensor
Ultrasonic level transmitter
Turbidity sensors
Other Industry standard 4-20 mA devices (Temp, PSI, etc.)

In some implementations, the 4-20 mA inputs and outputs can be compatible with the following units of measurement:
PPB
PPM
Mil/Y
PSI
mV
mA
uM/Y
mS/cm
pH
gallons
liters
Temp C
Temp F
mg/L In some implementations, a programmable timer can be used to for water meter inputs, such as: accumulator setpoint, number of gallons or liters the pulse timer accumulates up to before beginning a feed time cycle, feed time, how long the timer runs for when the accumulator setpoint is reached. A percent timer can runs continuously as a duty cycle in which a selected relay is activated for a percentage of the overall time cycle period specified. A cycle time can specify the overall feed cycle period. A percent of minutes to run can specify the percentage of the cycle time the relay will be activated for (subject to the Relay activation/deactivation hierarchy as outlined below). For example, the percentage can be adjustable from 0 to 100% in 1% increments. The cycle time is adjustable from 0 to 120 minutes (MMM as entered on the Controller). For example: if Cycle time equals 30 minutes and percent of minutes to run equals 50%, the relay will activate for 15 minutes, then deactivate for 15 minutes on a repeating cycle.

A Percent Post Bleed Timer (PPBT) can be tied directly to the amount of time the Bleed Relay is activated by either the Conductivity Probe or by a Pre-Bleed Cycle issued through a 28 Day Timer. The PPBT accumulates the time the Bleed Relay is active. When the Bleed Relay is deactivated the PPBT activates it relay for a percentage of the time the Bleed Relay was active. Note: The minimum resolution of the PPBT is 1 minute when the Percentage parameter is set to 1%. In other words when the Percentage parameter is set to 1% the Bleed Relay must remain active for at least 1 minute for time to be accumulated (0.6 seconds). If during the time the Percent Post Bleed Timer's relay is active the Bleed Relay activates again the PPBT will deactivate its relay and begin accumulating time again. However, the accumulated time will be added to the remaining time. Operation of the Percent Post Bleed Timer may not be due to the relay being activated by the HOA function. The Percent Post Bleed Timer includes a limit timer. Setting the HH:MM parameter to 00:00 disables the timer. Setting the limit time to a value greater than 00:00 enables the limit timer and causes the relay to deactivate and issue an alarm when the limit time countdown timer expires. If an alarm is raised it remains active until the beginning of the next Bleed Cycle. The alarm can also be cleared if a no flow condition occurs or if the power is cycled on the controller. If an alarm is raised any accumulated time is cleared.

Other timers may include: 28 day Calendar timer to program which day and week to run cycles, including et start time, set feed time, set Bleed lockout (Bleed lockout—prevents controller from running a bleed cycle for the duration of the lockout period), set Minimum Conductivity value, Pre-Bleed Time—Gives the option to do a pre-bleed before the feed time (i.e. bleed the tower before going into a long bleed lockout). For example, Set every Monday, Start time 8 am, Week=Every Week, Pre bleed=1 hr., Bleed lockout=4 hrs., Min Cond=1500 uS, Feed time=15 mines. In this example, on Monday at 8 am, the pre bleed starts (if min conductivity is over the min conductivity value) 2000 uS, it will run either for the entire hour—or it will stop if the min conductivity value is achieved. If either the pre bleed time limit is reached or the conductivity min value is reached, bleed lockout and feed time will begin. So for this case, feed time could be as late as 9 am or earlier. If no min conductivity value is entered, controller does pre-bleed for 1 hour.

As another example, in alarm mode, a relay can activate when there is an any alarm present. For example, in Set Point Control Mode, the controller 110 may be configured with up to four probes designed to monitor the systems Conductivity, pH, and ORP. Each probe has a dedicated relay which may be used to control external devices. Set Point Control Mode can be selected by choosing a specific probe or 4-20 mA input to monitor. Additional parameters are similar to those of the dedicated probe relays, these include: Set Point, Set Point Type, Alarm, and Differential. Set Point Control mode also includes a limit timer. In this example, selections can include: which input is it tied to—options include any probe (pH, cond, ORP), or any 4-20 mA inputs; setpoint (displayed in whatever unit of measure that the input is configured as, with some exceptions; setpoint type (rising or falling); setpoint differential; high alarm; low alarm; limit timer—set action once limit timer is reached (keep on or turn off). Sensor specific limit timers can include: for Cond, pH, ORP, & PTSA sensors; limit Timer: user can assign a limit time for how long a relay can remain active for within a control cycle; or user can choose whether or not the relay deactivates once limit is reached.

In some implementations, the controller 110 can allow for a timed sequence to be applied to all sensor inputs and all 4-20 mA inputs (through setpoint control mode). The sensor event can run regardless of other alarm conditions even if the sensor limit timer has expired. If the sensor limit timer is active when the sensor event mode begins it shall persist and may not clear regardless of the readings during the programmed sensor event. It can function like a 28 day timer program with all of the existing settings but with the following additions in each of the four (A, B, C, D) program submenus: two modes of operation shall be available—"Feed to", "Feed by", & "Off"—feed to: Allows the user to input a target setpoint; feed by: Determines the target setpoint automatically based off the current ORP reading at the start time, plus a user defined "feed by" amount.

Hold time—the amount of time the hold setpoint is held for. The hold time begins counting once the Hold Setpoint is reached. During the hold time the new setpoints are used to control the process until the hold time counts expires or the hold limit is reached. After the hold time count expires return to normal control settings. Hold Limit'Setting the time interval for how long it will spend trying to hold the Hold Setpoint value. Hold time—how long the hold setpoint value needs to be maintained. Hold setpoint—the setpoint that is used during the hold time, this may differ from the sensors normal control setpoint. Setpoint type can remain the same as the normal control setpoint type; however, the setpoint value can be a different Hold differential—the differential used during the hold time, this may differ from the sensors normal control differential. Hold Limit—the upper amount of time to attempt a hold time. The hold limit timer begins at the start time if the hold setpoint value is not present (measured by the sensor) at the start time, or after the feed time (if set) or the setpoint is not reached before it expires. Hold limit time can apply to subsequent attempts to reach the setpoint during the hold time. The hold limit timer exceeded alarm can be cleared if: the user enters a submenu; if another sensor event associated with the same probe/timer begins.

In some implementations, the controller 110 can permit 28 day & sensor event mode timers to store a single (1 max) sensor event mode or 28 day timer event in memory during no flow conditions. Once flow is restored the controller can run the timer functions from memory. If the time and date of the controller 110 is changed, or any 28 day timer program is changed all stored events are cleared from memory. If flow interrupts a timer while it is in progress 1 full event can be stored regardless of when the timer was interrupted in its program. When flow resumes the 28 day timer can run its full program as if the user programmed "Start time" for that timer has been reached. For example, a 28 day timer status can be appended to reflect that the controller is holding or running a stored cycle: For displaying machine states within the datalog–"Status=Off (1) stored cycle in memory"; "Status=Bleed Lock out–Running stored cycle."

For example, if no flow condition, occurs during an event (even within the last few seconds) that entire event would be stored and re-occur once the flow condition is regained (event would start from beginning). Further, if the feed has already been completed, it will not store it (i.e. bleed lockout); no flow store 1 event applies to Sensor Event Mode; can get stored in volatile memory and the event may not run if power is recycled; selection for choosing whether or not No flow store 1 applies can be within selection of the parameters for each 28 day & sensor event mode program (A, B, C, & D).

In some implementations, the controller 110 can use the remote communication network 118 to send notifications to the remote device 114. For example, notifications can comprise emails, texts (SMS), push notifications to an app, phone calls, or other forms of communication that alerts the user to a status, change in status, alarm, or other update.

As an illustrative example, the controller 110 can comprise a MicroVision EX Touch controller used for cooling tower applications. This type of controller can support the following hardware: up to four 4-20 mA input or outputs w/up to two 4-20 mA inputs able to be powered by the controller; Modbus RTU protocol for communication to Conductivity, pH, ORP, and PTSA probes; a 7" Touchscreen LCD interface; improved enclosure design; and/or BACNet and other advanced programming features. Further, in some implementations, the controller 110 can comprise: a NEMA 4X and IP65 Enclosure; touch screen display; universal power supply 90-250 VAC 1 phase; lockable front cover; easy access to user connections; ETL, ETLc and CE approvals; UV resistant material to resist fading and warping in direct sunlight; enclosure that support conduit or prewired versions (with pigtails and a power cord); enclosure that open from left to right allowing easy access to any user connections; enclosure that support integrated USB connection; and/or enclosure that has an industrial grade look and feel.

Figure 3:
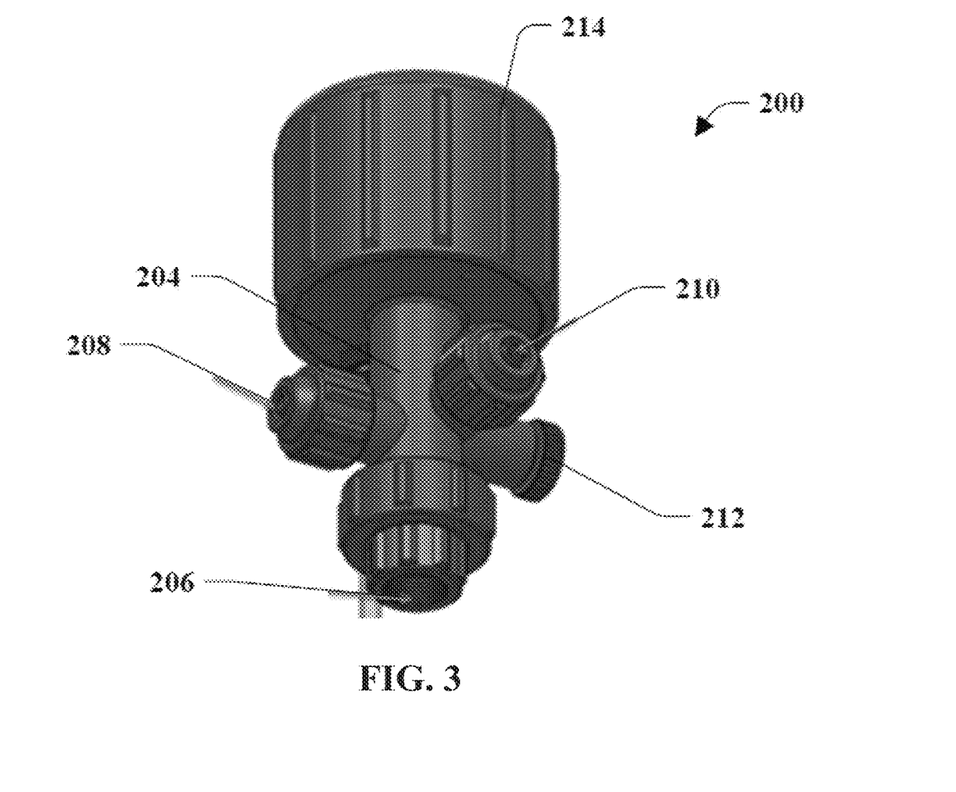
FIG. 3 is a bottom perspective view of the bleed valve.

Turning now to FIGS. 2-3, an exemplary bleed valve 200 is shown. The bleed valve 200 can have a height 202. In one embodiment, the bleed valve 200 has a height of 6.08 inches. The bleed valve 200 includes a body 204 with various ports coupled thereto. The bleed valve 200 can include an inlet 206, a discharge outlet 208, and a relief outlet 210. Any of the inlet 206, discharge outlet 208, or the relief outlet 210 may include any type of fitting chosen using sound engineering judgment, including a tube fitting or a threaded fitting. In one embodiment, the inlet 206 has a female threaded fitting, and the discharge outlet 208 and relief outlet 210 each have ⅜ inch tube fittings. The bleed valve 200 can also include a manual relief knob 212. The manual relief knob 212 allows a user to manually turn the knob to open or close the relief outlet 210. Further, the bleed valve 200 can also include a lid 214 that encloses various internal components described in more detail with regards to FIG. 6, the lid 214 may be threaded to screw on and off of the body 204 of the bleed valve 200, and may also have ribs on the outer circumference of the lid to facilitate a user gripping the lid.

Figure 4:
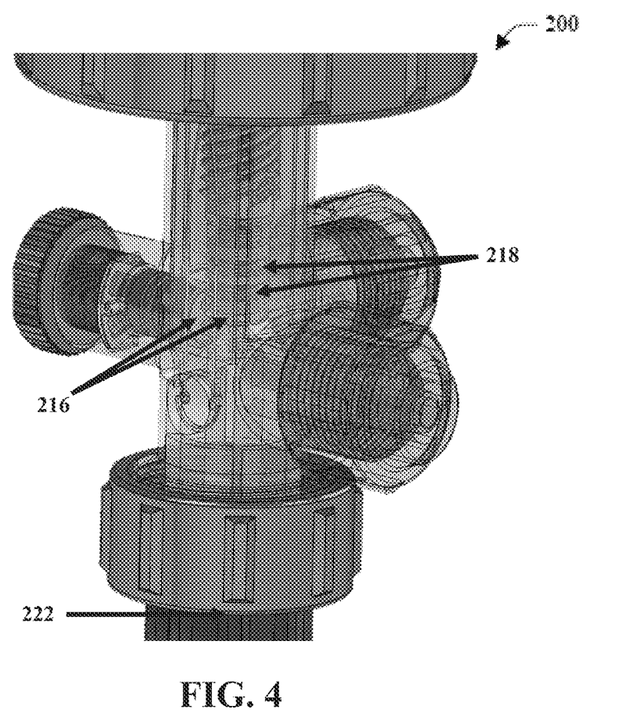
FIG. 4 is an enlarged perspective view of the bleed valve, showing inside components.
Figure 5:
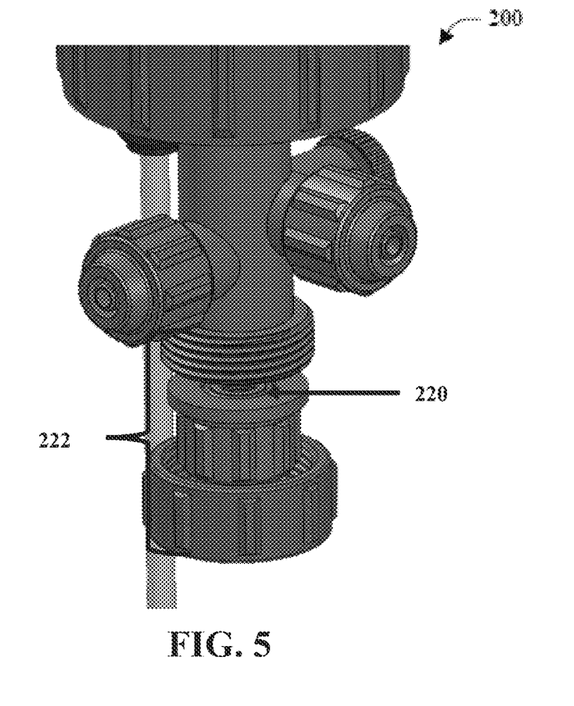
FIG. 5 is a perspective view of the bleed valve.

Turning now to FIGS. 4-5, the bleed valve 200 includes various connections and fittings internal to the body 204. A Teflon seat 216 can be included on internal connections such as screws used in the actuation of the automatic relief outlet 210 operation or manual relief outlet 210 operation. Further, bleed screw secondary seals 218 functions to seal the connection between components used in the actuation of the relief outlet 210. In one embodiment, the bleed screw secondary seal 218 is constructed from Viton. Optionally, connection O-rings 220 may be included at other locations internal to the bleed valve 200 such as at the union connection 222. In one embodiment, the connection O-rings 220 are constructed from Viton. In another embodiment, the connection O-rings 220 are constructed from Teflon. On the inlet 206 end of the bleed valve 200, the union connection 222 includes internal threading and functions to secure the inlet 206 fitting to the body 204 of the bleed valve 200. In one embodiment, the union connection 222 is constructed from polyvinylidene fluoride or polyvinylidene difluoride (PVDF). The union connection 222 allows for a 360-degree rotational adjustment of the bleed valve 220 orientation on top of the pump 104.

Figure 6:
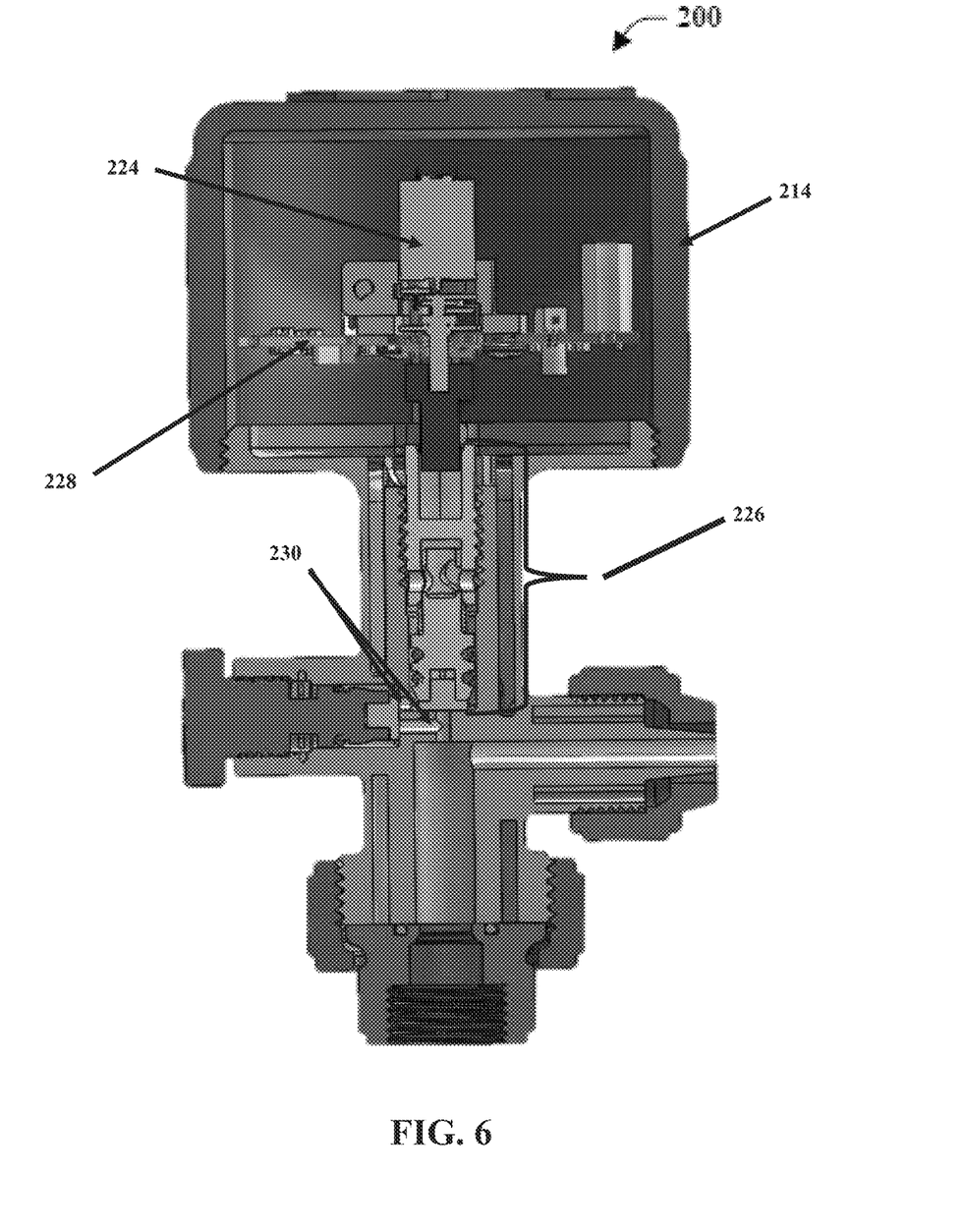
FIG. 6 is a cross-sectional view of the bleed valve.
Figure 7:
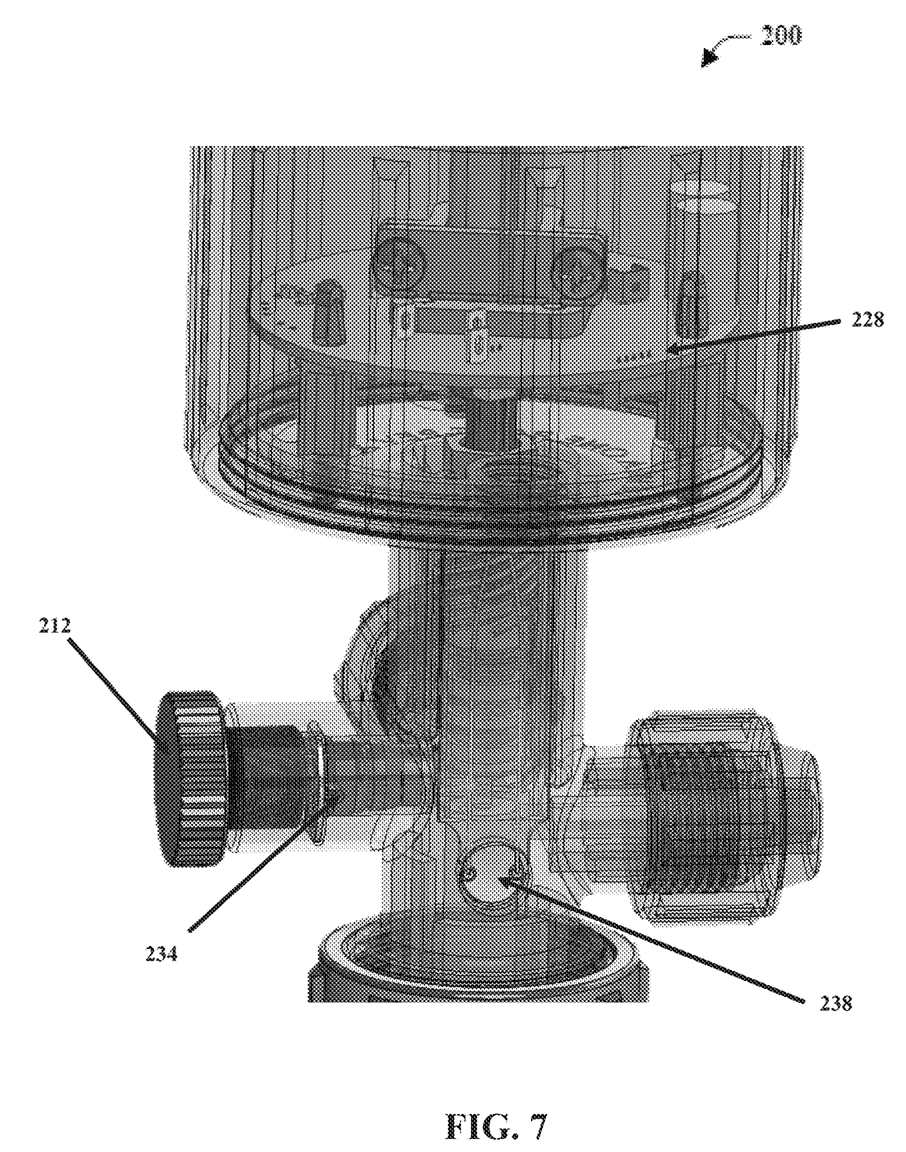
FIG. 7 is a perspective view of the bleed valve; showing inside components.
Figure 8:
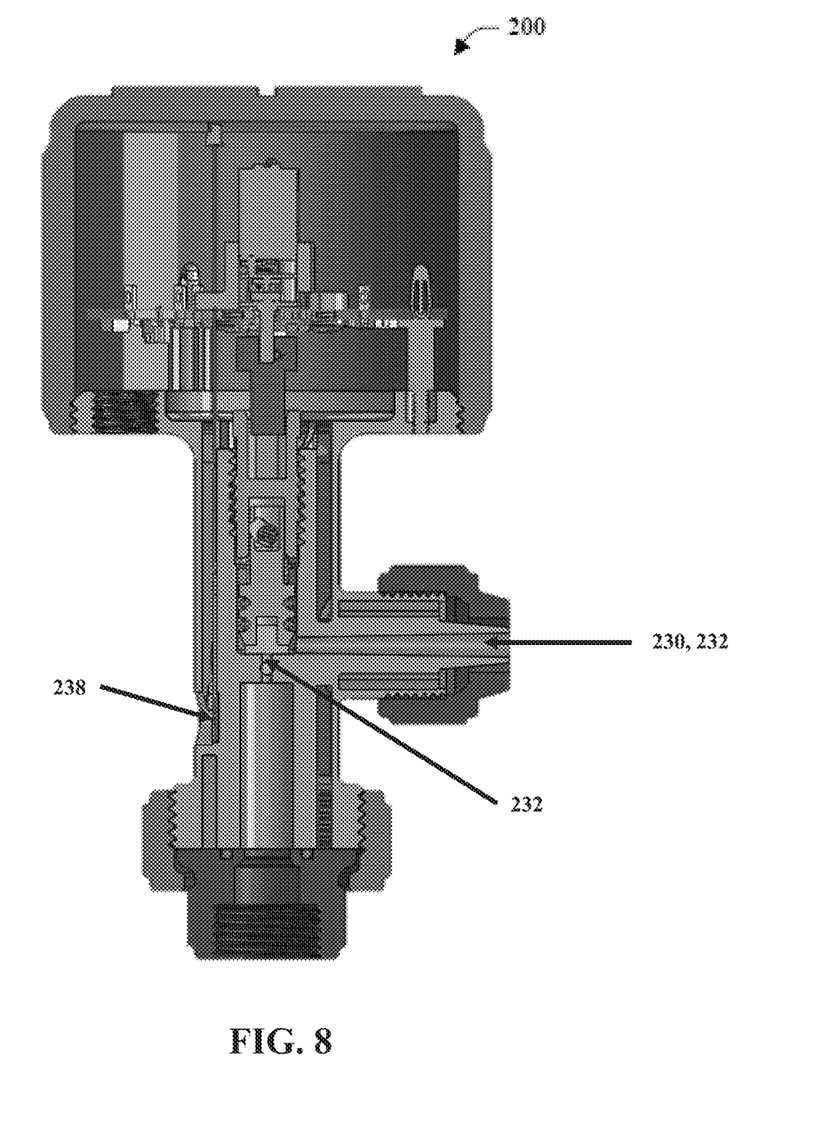
FIG. 8 is a cross-sectional view of the bleed valve.

Additional internal components of the bleed valve 200 are depicted in FIGS. 6-8. The bleed valve 200 can operate to control the relief outlet 210 automatically by way of a motor 224 that engages a relief port actuator 226. The motor can be mounted on a circuit board 228 enclosed by the lid 214. The relief port actuator 226 can include a shaft extending vertically downwards from the motor into the body 204 of the bleed valve 200. The motor 224 can rotationally engage the relief port actuator 226 by way of gears. In one embodiment, the motor 224 is a DC motor that engages the relief port actuator 226 with a 298:1 gear ratio. The bleed valve 200 includes both a manual relief flow path 230 and an automatic relief flow path 232. Both can run simultaneously through a shared relief outlet 210. The relief port actuator 226 operates to open and close the automatic relief flow path 232 independently from the manual relief flow path 230. On the other hand, the manual relief knob 212 rotationally engages with the manual relief actuator 234 extending horizontally from the manual relief knob 212 to open and close the manual relief flow path 230 converging with the same outlet from the automatic relief flow path 232.

FIG. 8 depicts a cross-sectional view of the bleed valve 200. Embedded within the body 204 of the bleed valve 200 is a sensor 238. In one embodiment, the sensor 238 is a piezoelectric disk placed adjacent to the main flow path through the body 204. Piezoelectric sensors use the piezoelectric effect to measure changes in pressure, acceleration, temperature, strain, or force by converting these parameters to an electrical charge. By placing the sensor 238 adjacent to the main flow path of the valve, the sensor is in a position where it can detect the subtle expansion of the valve body 204 during every stroke of the pump 104 where fluid is successfully displaced. When the pump 104 has lost prime, it means there is no fluid in the pump 104 head to displace. The signals generated by the sensor 238 during loss of prime are reduced (e.g., almost nonexistent)—thus allowing a user or operator to distinguish whether the pump 104 is primed or not. In certain embodiments where the pump 104 is a reciprocating diaphragm pump, each stroke of the pump 104 creates a pressure pulse. The pressure pulses created by each stroke of the pump 104 are converted to an electrical signal by the sensor 238 that is then communicated to the circuit board 228 for processing. During normal pumping operation, the electrical signal includes a series of continuous pulses having an amplitude. If the amplitude of the pulses fall below a predetermined threshold for a predetermined amount of time, the circuit board 228 logic determines that there has been a loss of prime on the pump 104. This determination may be communicated from the circuit board 228 to the pump 104 and/or the controller 110.

Upon normal pump operation, the pump 104 is primed and is actively pumping fluid from the supply tank 102. The bleed valve 200 inlet 206 is open, the discharge outlet 208 is open, and the relief outlet 210 is closed to allow the fluid to flow in through the inlet 206, into the body 204, and out through the discharge outlet 208 into the discharge tubing towards the flow meter 106 and/or injection valve at the water line 108. In an embodiment, the discharge outlet 208 is connected to dose into cooling tower process water—operating against the pressure of the cooling tower water system. The relief outlet 210 is routed back to the tank 102—which is a path that has little to no back pressure. As previously described, in its default operating state, the relief outlet 210 is shut and fluid flows from the inlet 206 through the discharge outlet 208 only. During loss of prime, vapor can be trapped in the pump 104 head and due to the compressibility of gas, the vapor will simply compress rather than get pushed through the pump 104 through the bleed valve's discharge outlet 208. This is because the amount of fluid pressure caused by the water line 108 exceeds the force needed to push the trapped vapor through the system. Opening the relief outlet 210 of the bleed valve 200 creates a path for the fluid that bypasses the discharge outlet 208 to a path back to the supply tank 102 that has little to no back pressure. In this case, the amount of force needed to push the trapped vapor out of the pump 104 head is less than the force needed to compress the vapor and keep it trapped in the pump 104 head—thus purging the trapped vapor out and letting the pump 104 regain prime. This process of opening the relief outlet 210 can be accomplished manually via the manual relief knob 212 or automatically via detection by the sensor 238 and resulting activation of the motor 224. When loss of prime is detected by the sensor 238, the pump's 104 speed may also be increased (e.g. automatically via internal control logic, or controlled by the controller 110) to assist in speeding up the recovery from loss of prime.

Figure 9:
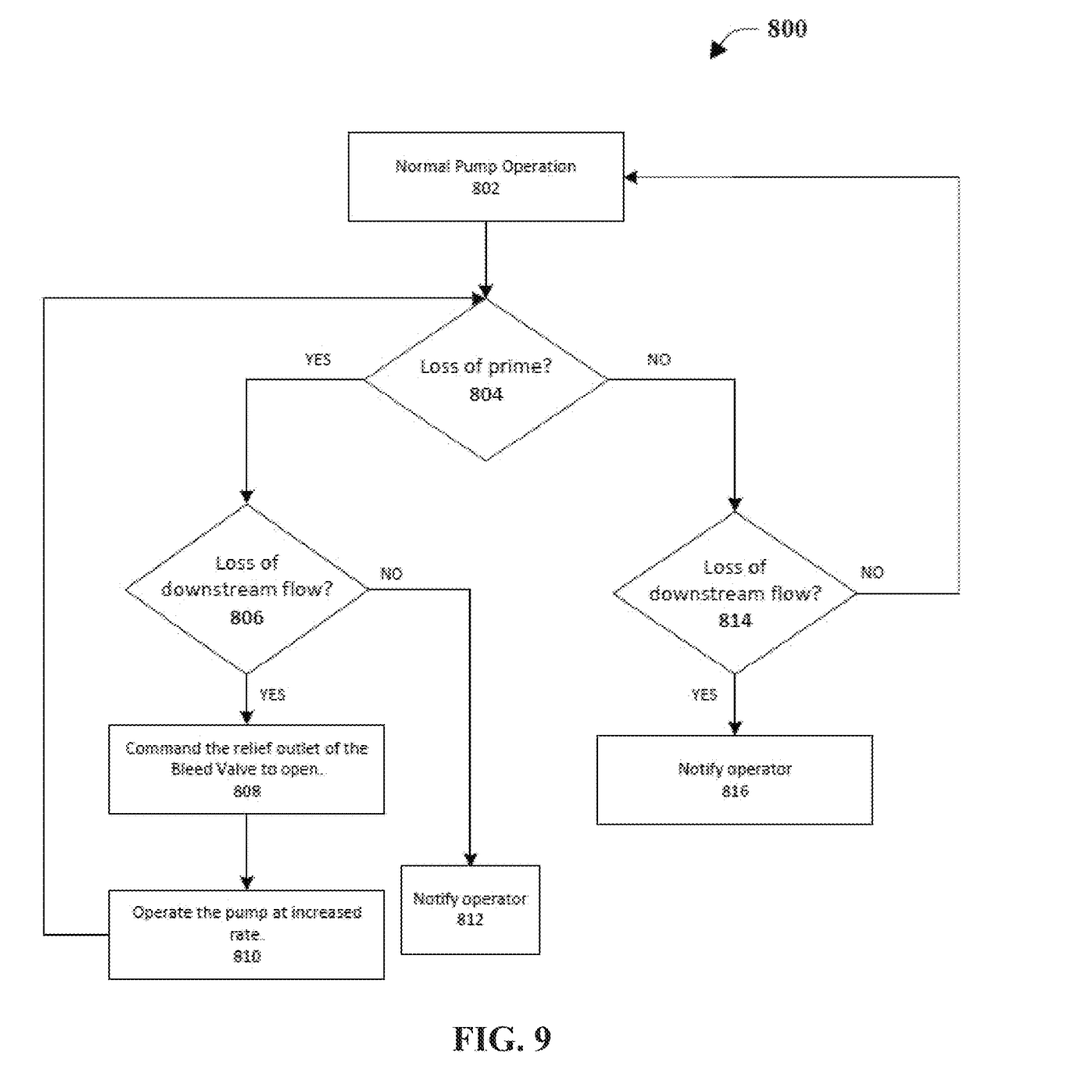
FIG. 9 is a flow chart depicting a method for operating the pump system.

The method 800 of loss of prime detection and automatic recovery is described in greater detail with reference to FIG. 9. At reference numeral 802, the pump 104 and bleed valve 200 are in normal pump operation. In this state, the pump 104 is primed and actively pumping fluid from the supply tank 102. The bleed valve 200 is in a state where the inlet 206 and the discharge outlet 208 are open, and the relief outlet 210 is closed. Fluid is flowing through the bleed valve 200 flow path, out through discharge tubing, through the flow meter 106 and into the water line 108. The sensor 238 is detecting the pressure pulses created by the primed pump 104 and the flow meter 106 is detecting fluid flow.

At reference numeral 804, the circuit board 228 interprets the electrical signal detected and communicated by the sensor 238 to determine if there has been a loss of prime on the pump 104. If the amplitude of the pulses in the electrical signal are below a predetermined amplitude threshold for a predetermined period of time, then the circuit board 228 determines that there has been a loss of prime. At reference numeral 806, the circuit board 228 or a controller located at the pump 104 monitors a signal from the flow meter 106 to determine whether there has been a loss of downstream flow. If there is a loss of prime detected, but no detected loss of downstream flow, a notification can be sent to a user or operator via the controller 110 and/or supervisory system 114. Such a situation could possibly indicate an equipment fault with either the sensor 238, circuit board 228, or flow meter 106, and would likely require an on-site visit to determine the source of the fault. On the other hand, if the circuit board 228 or pump 104 controller determine that there has been a loss of downstream flow in addition to there being a loss of prime (as determined at numeral 804), the system 100 proceeds to automatically reestablish prime in the pump 104 at reference numeral 808. It should be appreciated that the monitoring/determination of loss of prime at reference numeral 804 and the monitoring/determination of loss of downstream flow at reference numeral 806 may be performed in any order or simultaneously.

At reference numeral 808, the relief outlet 210 is commanded open. The circuit board 228 or pump 104 controller send a signal to operate the motor 224, which rotatably engages the relief port actuator 226 to open the automatic relief flow path 232. Next, at reference numeral 810, the pump 104 is commanded by the pump 104 controller, circuit board 228, or the controller 110 to operate at an increased rate. In one embodiment, the pump 104 increases its rate to 120% of its rate during normal pump operation while primed. Following reference numeral 810, the system 100 repeats the cycle until the sensor 238 detects that the pump 104 is primed and that there is flow detected by the flow meter 106. In certain embodiments, this cycle may be repeated for a predetermined number of cycles or for a predetermined amount of time even if prime is not reestablished in the pump 104. In the case where prime is not reestablished before the predetermined number of cycles or predetermined amount of time, the pump with shut down and a corresponding notification can be sent to a user or operator via the controller 110 and/or supervisory system 114.

Turning back to reference numeral 804, if the amplitude of the pulses in the electrical signal provided by the sensor 238 are above a predetermined amplitude threshold, then the circuit board 228 determines that there has not been a loss of prime. At reference numeral 814, the circuit board 228 or a controller located at the pump 104 monitors a signal from the flow meter 106 to determine whether there has been a loss of downstream flow. It should be appreciated that the monitoring/determination of loss of prime at reference numeral 804 and the monitoring/determination of loss of downstream flow at reference numeral 814 may be performed in any order or simultaneously. If there is no loss of prime detected, but a detected loss of downstream flow, a notification can be sent to a user or operator via the controller 110 and/or supervisory system 114 as depicted at reference numeral 816. Further, the pump 104 may also be shut down in this situation depending on a user configuration. Such a situation could possibly indicate a fault with the discharge hose downstream from the bleed valve 200. For example, such a situation can indicate a blown discharge hose or a leak in the hose. Shutting down the pump 104 in this situation prevents the fluid from being pumped into the surrounding environment. On the other hand, if no loss of prime is detected and no loss of downstream flow is detected, the system 100 continues normal pump operation.

As one example, embedded logic for monitoring and reacting to the direct loss in prime signal from the bleed valve (200) and/or Peizo sensor (238), and from a flow signal from the flow meter (106), can reside in the pump (104). In this example, a loss in prime recovery cycle (e.g., as in method 800, except notifications 812 & 816) can happen without intervention by the controller (110). As an example, the controller (110) can passively monitor these actions with respect to loss of prime detection and recovery, record the events in its data log, and can alert a user in real time when connected to the external control system (114), if so configured (e.g., as in method 800, at 812 & 816), for example.

The aforementioned systems, components, and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

The above examples are merely illustrative of several possible embodiments of various aspects of the present innovation, wherein equivalent alterations and/or modifications will occur to others skilled in the art upon reading and understanding this specification and the annexed drawings. In particular regard to the various functions performed by the above described components (assemblies, devices, and the like), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the illustrated implementations of the innovation. In addition although a particular feature of the innovation may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the innovation, including the best mode, and also to enable one of ordinary skill in the art to practice the innovation, including making and using any devices or systems and performing any incorporated methods. The patentable scope of the innovation is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the innovation has been described for purposes of illustrating the best mode known to the applicant at the time and enable one of ordinary skill in the art to practice the innovation, including making and using devices or systems and performing incorporated methods. The examples are illustrative only and not meant to limit the innovation, as measured by the scope and merit of the claims. The innovation has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the innovation is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A pump system comprising:
   a self-priming pump that pumps a treatment fluid to a feed location of a target fluid the pump operably coupled with a local communication network;
   a controller operably connected to the local communication network and further operably coupled with a remote communication network;
   a bleed valve comprising an inlet, a discharge outlet, and a relief outlet, wherein the bleed valve operably receives the treatment fluid from the self-priming pump through the inlet, and discharges the treatment fluid through the discharge outlet;
   a valve sensor disposed inside the bleed valve, wherein the sensor operably detects a loss of prime in the self-priming pump;
   a sensor array comprising one or more sensors, the sensor array detecting one or more conditions related to one or more of:
     a condition of the target fluid;
     a condition of the treatment fluid; and
     a condition of the pump;
   wherein the controller controls operation of the pump using the local communication network based at least on the one or more detected conditions; and
   wherein data related to the one or more conditions, operation of the pump, and/or operation of the controller are transmitted using the remote communication network.

2. The pump system of claim 1, the bleed valve operably, automatically opens the relief outlet based at least on the detected loss of prime in the self-priming pump by the valve sensor.

3. The pump system of claim 1, comprising a flow measurement device disposed between the pump and the feed location of the target fluid to measure a flow of the pumped treatment fluid, the flow measurement device communicating with the controller to control operation of the pump.

4. The pump system of claim 1, one or more of the sensors of the sensor array are operably coupled with the controller using a Modbus communication protocol.

5. The pump system of claim 1, the controller activating operation of the pump upon receiving an indication that the condition of the target fluid is outside of a predetermined parameter.

6. The pump system of claim 1, the data related to the one or more conditions, operation of the pump, and/or operation of the controller transmitted by the remote communication network which is operable to be displayed on a screen of a remote computing device.

7. The pump system of claim 1, the controller receiving operation instructions from a remote computing device using the remote communication network to alter operation of the pump system.

8. The pump system of claim 1, comprising a relay array comprising one or more relays, the relay array is operably coupled with the controller to receive operational signals to activate a target device.

9. The pump system of claim 1, the controller comprising a programmable input circuit board that operably receives data from a first coupled device; and the controller comprising a programmable output circuit board that operably transmits data to a second coupled device.

10. A pump system comprising:
a local communication network;
a pump operably coupled with the local communication network, the pump operably pumping a treatment fluid from a source to a feed location for a target fluid;
a controller operably coupled with the local communication network to communicate with the pump, the controller controlling operation of the pump based at least on data indicative of a first condition of the target fluid, resulting in the treatment fluid being dispersed into the target fluid, the controller comprising a remote communication component that operably couples with a remote communications network to receive data indicative of a status of the pump system, and transmit input that adjusts one or more functions of the pump system;
a bleed valve comprising an inlet, a discharge outlet, and a relief outlet, wherein the bleed valve operably receives the treatment fluid from the self-priming pump through the inlet, and discharges the treatment fluid through the discharge outlet;
a valve sensor disposed inside the bleed valve, wherein the sensor operably detects a loss of prime in the self-priming pump, wherein the bleed valve automatically opens the relief outlet based at least on the detected loss of prime in the self-priming pump by the valve sensor;
a sensor array comprising one or more target fluid sensors operably coupled with the controller, the one or more target fluid sensors respectively detecting a second condition of the target fluid at a sensor location disposed upstream from the feed location;
wherein the controller activates one or more relays based on data from one or more of the first or second detected conditions of the target fluid, resulting in activation of the pump.

11. The pump system of claim 10, comprising a flow measurement device disposed between the pump and the feed location of the target fluid to measure a flow of the pumped treatment fluid, the flow measurement device communicating with the controller to control operation of the pump.

12. The pump system of claim 10, comprising a remote server system that operably receives the status data and provides the status data to a remote device for viewing by a user; and operably transmits commands from the remote device.

13. A pump system comprising:
a local communication network comprising a CAN bus;
a self-priming pump that pumps a treatment fluid to a feed location of a target fluid the pump operably coupled with the local communication network;
a controller operably connected to the local communication network to transmit data to and receive data from the pump, the controller further operably coupled with a remote communication network to transmit the data from the pump to a remote device coupled with the remote communication network,
a sensor array comprising one or more of:
one or more sensors disposed upstream from the feed location to detect a condition of the target fluid;
one or more sensors detecting a condition of the treatment fluid comprising one or more of: a volume of the treatment fluid pumped, and an amount of the treatment fluid remaining at a source location; and,
one or more sensors disposed at the pump to detect a condition of the pump, comprising one or more of: activation status of the pump, and loss of prime of the pump;
wherein the controller operates the pump using the local communication network based at least on the one or more detected conditions; and
wherein the controller operably activates one or more relays based at least on the one or more detected conditions.

14. The pump system of claim 13, comprising a bleed valve comprising an inlet, a discharge outlet, and a relief outlet, wherein the bleed valve operably receives the treatment fluid from the self-priming pump through the inlet, and discharges the treatment fluid through the discharge outlet, and a valve sensor disposed inside the bleed valve, wherein the sensor operably detects a loss of prime in the self-priming pump.

15. The pump system of claim 14, wherein the bleed valve operably, automatically opens the relief outlet based at least on a detected loss of prime in the self-priming pump by the valve sensor.

* * * * *